(12) United States Patent
Fergusson et al.

(10) Patent No.: US 6,479,620 B1
(45) Date of Patent: Nov. 12, 2002

(54) PROCESS FOR CONVERTING CAPROLACTAM TO NYLON 6

(75) Inventors: Stuart B. Fergusson, Kingston (CA); Ernest Keith Marchildon, Kingston (CA); Ahmet Turgut Mutel, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/872,288

(22) Filed: Jun. 1, 2001

(51) Int. Cl.[7] ................... C08G 69/16; C08G 69/14
(52) U.S. Cl. ................ 528/310; 528/322; 528/323; 528/324; 528/332; 528/335
(58) Field of Search ................ 528/323, 310, 528/332, 322, 335, 324

(56) References Cited

U.S. PATENT DOCUMENTS

| | | | | |
|---|---|---|---|---|
| 4,310,659 A | * | 1/1982 | Yates et al. | 528/323 |
| 4,327,208 A | * | 4/1982 | Hehr et al. | 528/323 |
| 4,354,020 A | * | 10/1982 | Rotzoll et al. | 528/323 |
| 4,816,557 A | * | 3/1989 | Pipper et al. | 528/500 |
| 4,978,743 A | * | 12/1990 | Selbeck et al. | 528/499 |
| 5,223,183 A | * | 6/1993 | Monkelbaan et al. | 261/114.1 |
| 5,283,315 A | * | 2/1994 | Kawakami et al. | 528/326 |
| 6,093,488 A | * | 4/2000 | Born et al. | 528/310 |
| 6,194,572 B1 | * | 2/2001 | Buijs et al. | 540/538 |
| 6,201,096 B1 | | 3/2001 | Marchildon et al. | 528/310 |
| 6,320,021 B1 | * | 11/2001 | Hildenbrand et al. | 528/499 |

* cited by examiner

Primary Examiner—P. Hampton-Hightower
(74) Attorney, Agent, or Firm—Gerald E. Deitch

(57) ABSTRACT

A process for making nylon 6, in which caprolactam and water are reacted in a multistage reactive distillation column.

7 Claims, 4 Drawing Sheets

PROCESS FOR CONVERTING CAPROLACTAM TO NYLON 6

BACKGROUND OF THE INVENTION

1. Field of the Invention

The present invention concerns a process for the conversion of caprolactam to nylon-6.

2. Related Art

Nylon-6 is produced commercially using caprolactam as the starting material. A commercial process typically involves heating caprolactam in a VK tube at atmospheric pressure for 12 to 24 hours. This process produces a nylon-6 product that contains 7 to 10% caprolactam in the product. Excess caprolactam is extracted using an 8 to 12 hour aqueous extraction process. The extracted product is then dried for 8 to 12 hours producing a dry product containing 0.2 to 0.3% caprolactam. While this process has met with commercial success, it has a long reaction residence time and a slow extraction/drying step.

U.S. Pat. No. 6,201,096 discloses a process for the production of a polyamide by reaction of an omega-aminonitrile with water in a vertical multistage reactor that is swept by steam. For example, this process can convert 6-aminocapronitrile to nylon-6.

SUMMARY OF THE INVENTION

The present invention is a process for making nylon-6, comprising:

(a) establishing a reactive distillation column having a top and a bottom, the top having a temperature of 150 to 200 degrees C. and the bottom having a temperature of 240 to 260 degrees C., the column having a plurality of spaced apart plates disposed therein, thereby defining a plurality of stages, each stage being defined by the column volume between adjacent plates, each stage being separately heated to a predetermined temperature;

(b) introducing caprolactam and water into a reaction zone having a temperature of 200 to 250 degrees C. and a pressure of 100 to 300 psia (0.69 to 2.07 MPa) to make a reaction product comprising caprolactam, linear aminocaproic acid and water;

(c) introducing the reaction product into the reactive distillation column at or near the top of the column while introducing steam at or near the bottom of the column; and (d) recovering nylon 6 from the bottom of the column.

The process is expected to involve relatively short holdup times for the conversion of caprolactam to nylon-6. It is also expected to produce nylon-6 with relatively low amounts of free caprolactam and/or other low molecular weight compounds.

BRIEF DESCRIPTION OF THE DRAWING

FIG. 5 is a sectional view of a stage taken along line V—V in FIG. 6.

DETAILED DESCRIPTION OF INVENTION

The process of the present invention is a continuous process for preparing nylon-6 by reaction of caprolactam in a countercurrent multistage column reactor. An aqueous solution of caprolactam is first reacted in a pre-reactor under pressure to initiate (facilitate) ring opening reactions to convert a portion of caprolactam into linear aminocaproic acid. The mixture from the pre-reactor is continuously fed to a countercurrent multistage reactor where the reaction mixture continues to react via both poly-condensation and poly-addition reactions to form a polyamide. Unreacted caprolactam is continuously stripped from the polymeric mixture near the bottom of the reactor by steam flowing countercurrently to the reaction mixture and re-absorbed into the reaction mixture at the upper stages of the reactor. Hence, a polyamide containing significantly less caprolactam than the equilibrium value dictated by the poly-addition reaction should be produced at shorter residence times than conventional reactors due to the counter-current steam stripping and subsequent internal caprolactam recycle.

Figure 1:
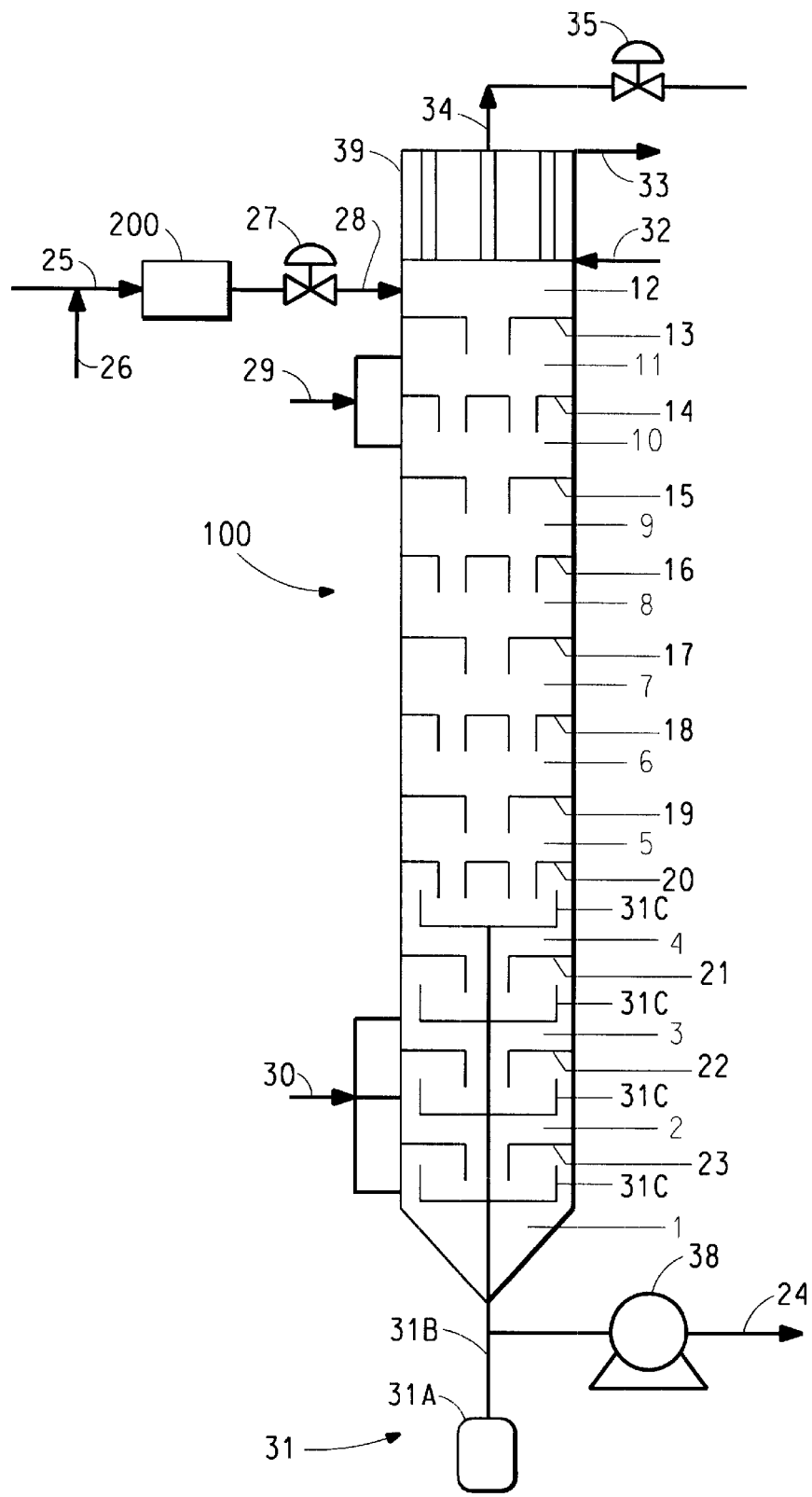
FIGS. 1 and 3 are schematic views of apparatus that can be used to carry out the present invention.

Referring now to FIG. 1, caprolactam 25 and water 26 are first reacted at elevated temperature in a pre-reactor 200 to produce a product 28 that contains some linear aminocaproic acid. The mole ratio of caprolactam to water is not critical, but preferably is about 0.4 to 0.6. The pre-reactor temperature is maintained between 200 and 250 degrees C. and the pressure is between 100 and 300 psia (0.69 to 2.07 MPa), preferably between 150 and 200 psia (1.03 to 1.38 MPa). A plug flow type reactor is preferred to achieve a narrow residence time distribution. For this purpose a tubular reactor or a column reactor can be used. Preferably the column reactor is an up-flow packed reactor. Hold-up time for the pre-reactor is between 20 to 40 minutes, preferably 30 minutes.

The pre-reactor reaction product 28 is fed continuously near the top of a multistage column reactor 100. Standard distillation columns are suitable for use in the process of the current invention if the residence times in the stages are increased to give sufficient time for the reaction times required. The required liquid residence time in the reactor is between four hours and eight hours to achieve the average molecular weights required for a commercially usable product. The column reactor 100 is equipped with internals, such as, but not limited to, perforated plates 13 to 23 and an agitator assembly 31, comprising a motor 31A, a shaft 31B, and agitiator blades 31C. These internals should be configured to cause effective staged contact of the countercurrently flowing steam with the liquid reaction mixture to ensure that adequate mass transfer is achieved for effective stripping of the caprolactam and cyclic dimer, especially in the lower part of the column reactor.

Figure 2:
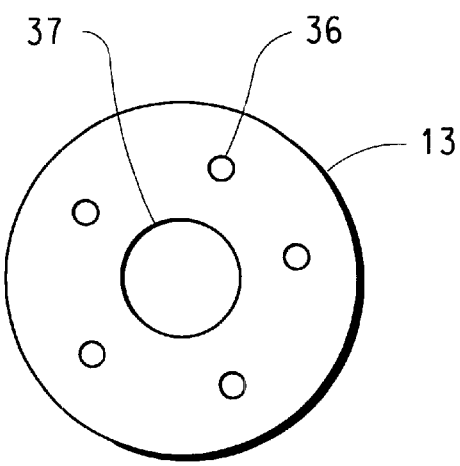
FIGS. 2 and 2A are plan views of plates separating stages of the column reactor of the present invention.
Figure 2A:
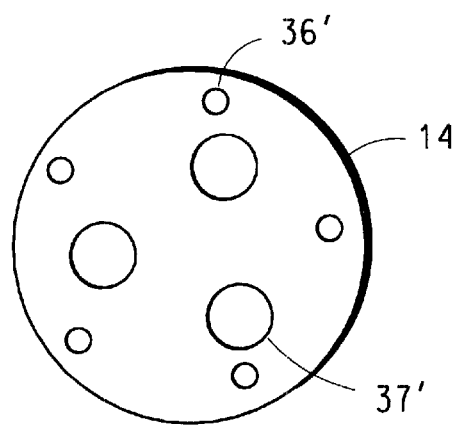

As illustrated in FIG. 1, the interior of the multistage reactor 100 is divided into discrete stages 1 to 12 using perforated plates 13 to 23 between the stages. The plates, shown in FIG. 2 (and FIG. 2A), include small perforations 36 (36') which allow vapor to flow upward from stage to stage, and a larger downcomer tube (or tubes) 37 (37') which leads from each stage into and below the surface of the reaction mixture in the stage below, allowing the liquid to flow downward from stage to stage. A flooded tray configuration is preferred in the bottom stages where agitation is employed to achieve good mixing and improved mass transfer. The shaft 31B for the agitator blades 31C should easily extend through the concentric downcomers 37. Stages where no agitation is required can be any type of tray configuration employed in distillation equipment, such as flooded or weir trays but preferably with arrangements shown in FIGS. 4, 5 and 6 to minimize any liquid back flow due to vapor traffic in the column and to provide adequate mixing of the incoming liquid into each stage reaction mass. The number of stages is chosen to achieve a high rate, per unit of liquid volume, of mass transfer and chemical reaction. Six to fifteen stages are typical.

Referring again to FIG. 1, the pre-reactor reaction product 28 is fed continuously near the top of the multistage column reactor 100, and steam 30 is fed continuously to one or more of the bottom-most stages of the reactor. A pressure control valve 27 is employed between the pre-reactor 200 and the column reactor 100 to maintain a higher pressure in the pre-reactor compared to that of the column reactor. The steam can be saturated steam, steam containing a small amount of water, or superheated steam, with superheated steam being preferred in order to minimize the heating requirement within the reactor. The steam is introduced into the reactor 100 at a weight flow rate that is at least 30 percent of and preferably approximately equal to the weight flow rate of the pre-reactor feed. A vapor stream 34 is removed from the top of the column. The stream 34 will contain steam and some caprolactam. The caprolactam can be further separated and recycled to the column reactor 100. Polyamide product 24 is continuously removed from the bottom stage 1 using, for example, pump 38. The column reactor 100 preferably includes means to separate and return to the column any caprolactam which leaves the top part of the column as a vapor or as an entrained liquid. One such means is a partial condenser 39 at the top of the column. By means of manipulating the flow and temperature of a cooling fluid into 32 and out of 33 the cooling side of the partial condenser 39, the condenser is maintained at a temperature sufficient to condense and return most of the caprolactam to the column while allowing steam to be removed in vapor stream 34. The use of the partial condenser can control the temperature of the top stage 12 of the column reactor 100. Further control of the temperature can be achieved by manipulation of the flow rate of water stream 26 to the pre-reactor. Additionally, one or more stages can be added to the column reactor above the feed stage, and a partial condenser (not shown) can be provided above the uppermost of these stages to provide reflux liquid.

The temperature in the column should be maintained sufficiently high that the reaction mixture does not freeze. The temperature at the top stage 12 of the column is maintained at a lower temperature than the temperature at the bottom stage 1. The top temperature is maintained at a temperature that is high enough to keep the reaction mixture in a liquid state, and condense most of the caprolactam in the vapor stream entering the stage from the stage below. The temperature of the top stage of the column reactor 100 should be between 150 and 200 degrees C. It is possible to use a combination of upper stage 12 temperature and a partial condenser 39 to minimize outflow of caprolactam. The temperature of bottom stage 1 is adjusted to be kept sufficiently above the melting point of the polyamide to keep the reaction mixture in a liquid state, but as low as possible to minimize the regeneration of caprolactam and cyclic dimer through a reverse polyaddition reaction. The temperature of the bottom stage should be between 240 and 260 degrees C.

The ability to achieve a nylon-6 product with a free caprolactam content significantly lower than the equilibrium concentration depends on the cumulative difference between the removal of caprolactam from the reaction mixture by steam stripping and the generation of caprolactam by reverse reaction. This ability requires that the average temperature in the stages not exceed a value above which the regeneration rate of caprolactam becomes higher than the stripping rate by steam. Averaging over the bottom half of the reactor, this temperature is approximately between 240 to 260 degrees C.

Figure 3:
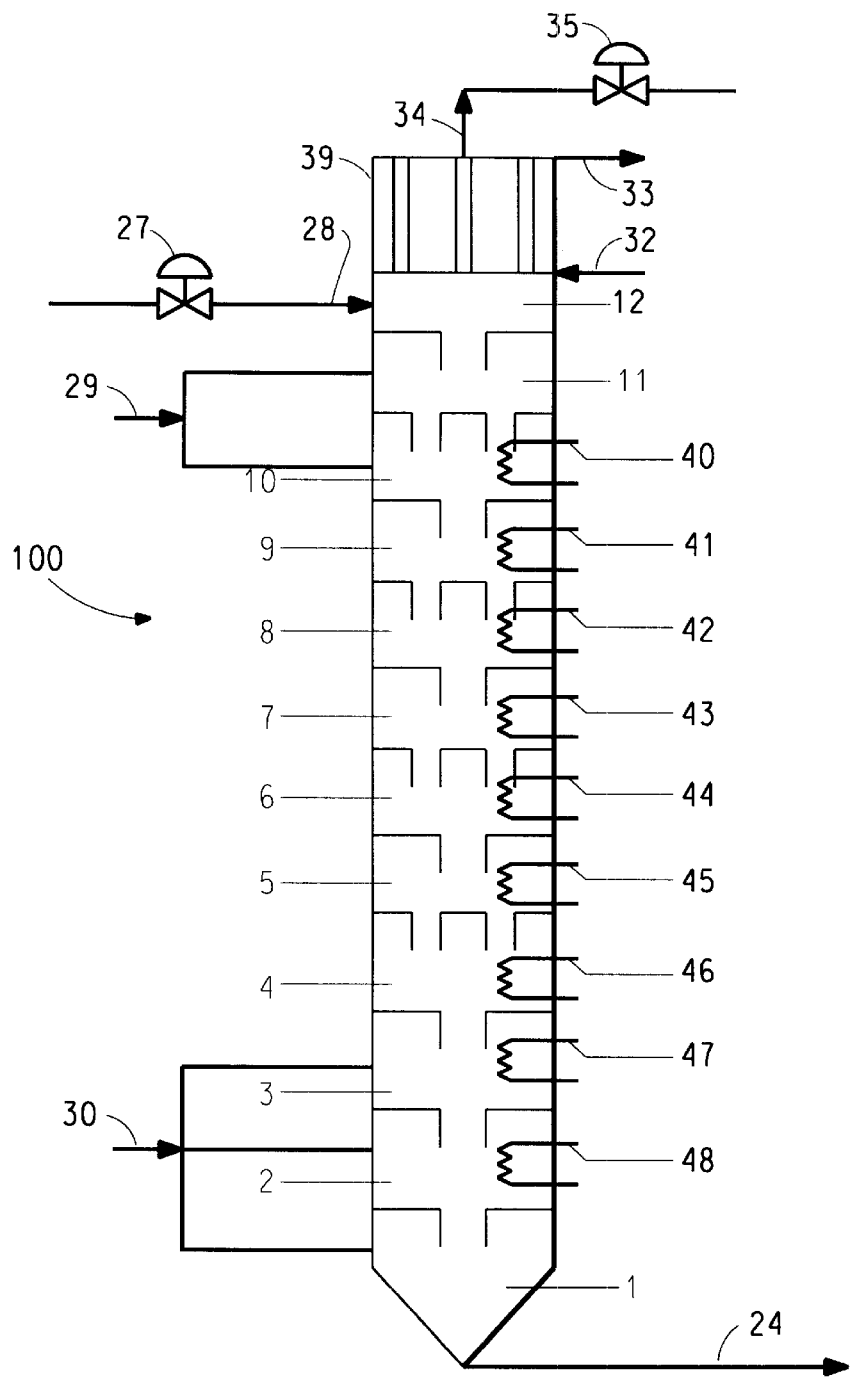

Referring now to FIG. 3, all or most stages 1 to 12 are preferably equipped with means for independent control of temperature. This control is best accomplished by use of a hot flowing liquid heat transfer medium passing through jackets, coils, or other heat-transfer devices 40 to 48 which can be used for both heating and cooling.

In a standard VK tube process, heat needs to be added near the top of the reactor to bring the reaction mixture to the desired reaction temperature, and the exothermic reaction heat has to be removed in the lower zones to prevent excessive temperatures leading to higher equilibrium caprolactam levels. In the present invention, heating or cooling requirements in the bottom one third of the reactor are minimal. Heat required for caprolactam stripping is approximately balanced with the heat generated by reaction. Bottom stage 1 to 5 temperatures can be controlled by a combination of superheat of the injected steam 30 and the heating coils 46 to 48. Highest heat load in the column is in the middle stages 6 to 9 due to heat required to vaporize significant amount of caprolactam from the reaction mixtures. Stage temperatures are controlled by the manipulation of the heating medium temperature and flow rate. In the upper stages 10 to 12 of the column reactor 100, heat needs to be removed to maintain the desired stage temperatures. A large portion of the caprolactam in the vapor stream within the column reactor is condensed into the reaction mixtures in the upper stages liberating the associated heat of condensation. The column stages in the upper one third of the column are optionally equipped with means for water injection 29 for temperature control.

The column is operated at atmospheric or sub-atmospheric pressure, preferably less than 15 psia (0.10 MPa), more preferably between 6 and 8 psia (0.041 to 0.055 MPa) to achieve the desired low level of caprolactam in the product stream 24. The product should preferably contain less than 1%, most preferably less than 0.5% by weight free caprolactam to minimize or eliminate the need for water extraction. The pressure can be controlled by means of a pressure control valve 35 and a vacuum system (not shown), like annular steam vacuum jets or vacuum pumps. Pressure control valve 35 is continuously adjusted to vary the outflow of vapor stream 34 in response to the measured pressure in the vessel.

The main advantage of the process of the present invention is expected to be that the countercurrent operation of the column will result in continual stripping of caprolactam from the lower parts of the column reactor, with high conversion, and re-condensing it at the upper parts, with low conversion, so that a nylon-6 product with low free caprolactam content is achieved.

Steam is injected into the vapor space in the stages, preferably by use of a gas distributor to achieve a uniform distribution. Steam is preferably injected into the liquid zone in the bottom stage 1 to maximize the mass transfer efficiency in this stage. This can be accomplished by the use of a gas distributor which has high pressure drop nozzles to avoid nozzle pluggage and provide uniform gas distribution.

In the upper stages of the column, the viscosity of the reaction mixture should be low enough that with appropriate design of the perforated barriers 13 to 23 gas bubbles from the steam vapor result in effective mixing in the reaction mixture. At the bottom of the column, where the viscosity is highest, a mixer assembly 31 is preferably used in one or more of the bottom-most stages in the reactor. In the reactor shown in FIG. 1, mechanical mixing is provided in the bottom four stages by use of agitator blades 31C.

Preferably, mixing within each stage is achieved by either proper arrangement of heating coils 46 to 48 to assist gas induced mixing or by mechanical agitation in the lower stages. Insufficient mixing reduces the desired reaction efficiency, resulting in a requirement for a larger size column reactor to achieve the same caprolactam to nylon 6 conversion at a given flow rate. Height-to-diameter ratio for each stage is preferably between 0.5 to 1.2 to achieve the desired mixing efficiency.

Axial mixing between the stages in the column reactor (as a result of liquid backflow through the downcomers induced by large bubbles either entering the downcomers or forcing liquid into the downcomers as they approach the downcomers) will reduce the overall efficiency in the column reactor. The following preferred arrangements of downcomers can be employed in the column reactor 100 to reduce axial mixing.

Figure 4:
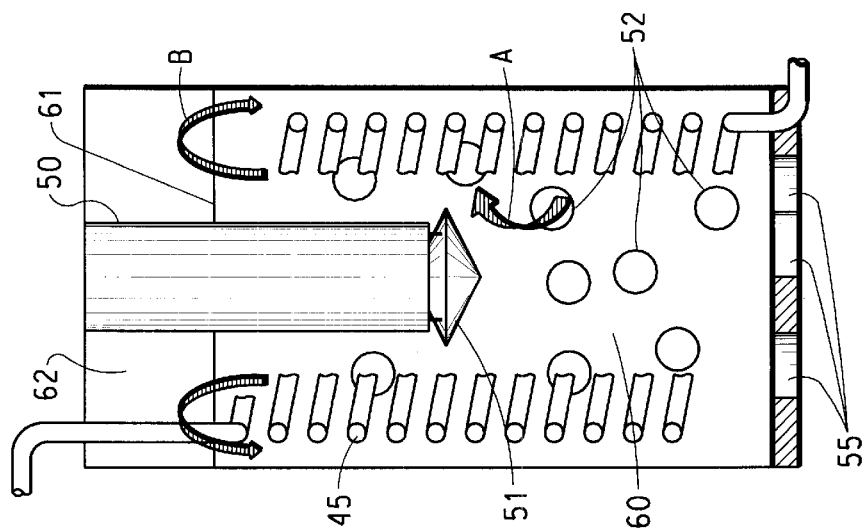

Referring now to FIG. 4, there is shown the internal arrangement of a stage such as stage 9 of the column reactor 100. The stage contains a continuous liquid portion 60 (from the bottom of the stage to the level indicated by reference numeral 61) and a continuous vapor portion 62. There is also shown coils 45 for heating or cooling the stage. The arrow indicated as "B" shows the movement of the liquid around the coils 45 caused by the bubbles 52. The stage contains a circular central downcomer 50, which preferably has a bi-conical attachment 51 at the bottom to (1) deflect the gas bubbles 52 away from the downcomer, (2) prevent gas bubbles entering the downcomer, and (3) deflect the liquid exiting the downcomer (shown by the arrow indicated as "A"). The gap between the attachment 51 and the bottom of the downcomer 50 is needed to minimize liquid backflow in the downcomer induced by the pressure field created by the gas bubbles travelling near the downcomer exit. The gap is adjusted such that the pressure drop created by the liquid flow is between 0.5 to 1.0 inches of liquid. At the bottom of the stage are downcomers 55 that allow liquid to flow into the next lower stage, such as that shown in FIG. 5.

Figure 6:
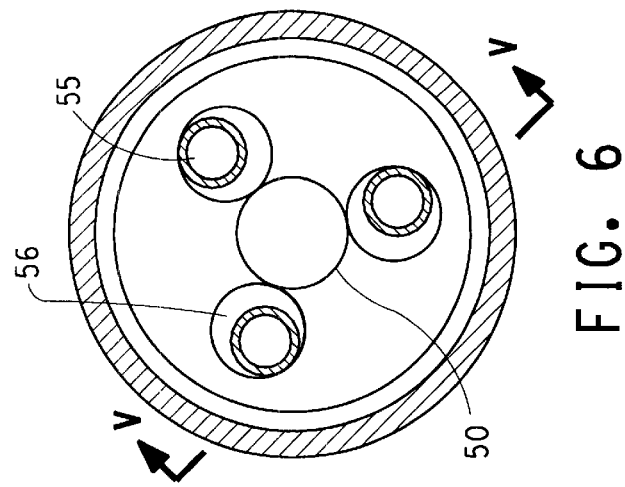
FIG. 6 is a sectional view of the interior of a stage taken along line VI—VI in FIG. 5.
Figure 5:
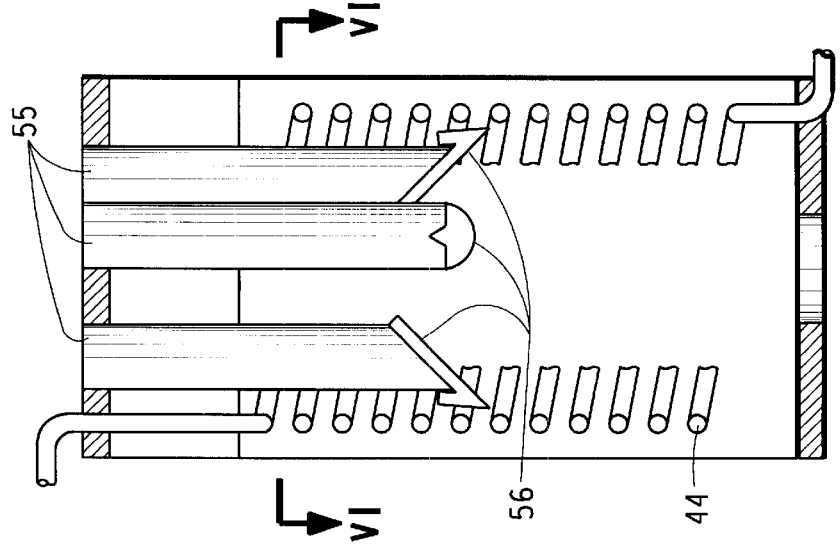
FIGS. 4 and 5 are elevational views of the interior of stages in the column reactor of the present invention.

Another preferred arrangement involves multiple downcomers 55 arranged in a triangular pattern, as illustrated in FIG. 5. The bottoms of these downcomers 55 are truncated at an angle between 30 and 60 degrees with welded, extended ellipsoidal plates 56 to deflect gas bubbles. Liquid is allowed to exit through a rectangular slit protected by the extended plate and pressure dissipating attachment. Slit dimensions are arranged to provide a pressure drop between 0.5 inches and 1.0 inch liquid to minimize backflow. The preferred arrangement of downcomers 50 and 55 with respect to each other is shown in FIG. 6 to achieve a maximum mixing efficiency in the stage.

Preferably the reactor stages are configured as flooded trays to allow an agitator shaft 31B to pass through the downcomers (not illustrated) to avoid sealing the rotating shaft against liquid. Typically, mechanical mixing is required at the bottom four stages of the reactor to minimize liquid by-pass. In these stages mixing induced by gas traffic (as indicated by the flow arrows in FIG. 4) may not be sufficient to achieve the desired quality of mixing at higher viscosities. Even though weir trays can be employed above the agitated stages, flooded trays are still preferred, because they allow reactor level control to be achieved by measurement at the uppermost stage where it is most convenient.

The polyamide product 24 removed from the bottom of the column is expected to generally have a number average molecular weight between 13,000 and 17,000 and a relative viscosity (RV) between about 35 and 55. The polyamide product is expected to contain water extractable compounds, such as caprolactam, at less than 1% by weight and cyclic dimer less than 0.5% by weight. The polyamide product 24 is continuously removed from the bottom of the reactor by means of a pump 38 and can be pelletized using methods known in the art, such as strand casting.

The following example was generated by the use of a mathematical model of the process, which includes the necessary mass and energy balances, along with reaction kinetics and equilibria, mass transfer and tray hydraulics. One of the advantages of the counter-current column process is expected to be the low extractables levels in the product due to steam stripping. An ability to achieve the desired low levels of extractables is directly related to the efficiency of mass transfer. Mass transfer efficiency is lowest under conditions where the liquid viscosity is high. Hence, mass transfer efficiency has been measured in a lab apparatus with the high viscosities expected at the bottom stage of the column. A two stage 4 inch diameter glass column apparatus has been utilized to measure the mass transfer coefficients with steam stripping. Polyamide 6 pellets of number average molecular weight approximately 16,000 were melted in the apparatus, and steam was injected into the liquid in the bottom stage using various gas distributors. Polymer was melted with steam injection at different steam-to-polymer ratios, including no steam injection, to confirm the extractables regeneration rates. Polymer and condensate samples were collected at regular intervals and analyzed for extractables content to determine the mass transfer coefficients. Mass transfer coefficients and kinetic rates determined with those lab experiments were included in the mathematical models to generate the example presented below.

EXAMPLE

A counter-current column with 12 stages was simulated using the mathematical model, with a pre-reactor operating at 150 psia (1.03 MPa) and 220 degrees C. A caprolactam solution containing 17% water by weight is fed to the pre-reactor at a rate of 172 lb/hr. Pre-reactor was chosen to have a 30 minute hold-up time under these conditions. Reaction mixture from the pre-reactor is predicted to contain 49.6% caprolactam by weight, 10% residual water by weight, remainder being a polymeric mixture with a degree of polymerization of 14. This mixture is continuously fed to the top stage of the reactor which is maintained at 160 C. Superheated steam is injected at the bottom stage of the reactor at a rate of 80 lb/hr. The bottom one-third of the reactor is maintained at 240 C. Stage temperatures for the upper one third of the column are allowed to reach adiabatic conditions. Column pressure is controlled at 7.5 psia (0.052 MPa).

A vapor is expected to leave the top stage entering the partial condenser at a rate of 126 lb/hr. This vapor is predicted to contain 22% by weight caprolactam and 78% by weight steam. A polymer product from the bottom of the reactor is predicted to be produced at a rate of 125 lb/hr, and to have a number average molecular weight of 17700 (55 RV). The polymer product is predicted to contain 0.3% caprolactam, 0.27% cyclic dimer and 0.2% water. Total residence time in the column reactor is predicted to be six hours.

What is claimed is:

1. A process for making nylon 6, comprising:
   (a) establishing a reactive distillation column having a top and a bottom, the top having a temperature of 150 to 200 degrees C. and the bottom having a temperature of 240 to 260 degrees C., the column having a plurality of spaced apart plates disposed therein, thereby defining a plurality of stages, each stage being defined by the column volume between adjacent plates, each stage being separately heated to a predetermined temperature;
   (b) introducing caprolactam and water into a reaction zone having a temperature of 200 to 250 degrees C. and a pressure of 100 to 300 psia (0.69 to 2.07 MPa) to make a reaction product comprising caprolactam, linear aminocaproic acid and water;
   (c) introducing the reaction product into the reactive distillation column at or near the top of the column while introducing steam at or near the bottom of the column; and
   (d) recovering nylon 6 from the bottom of the column.

2. The process of claim 1 wherein the reaction zone has a pressure of 150 to 200 psia (1.03 to 1.38 MPa).

3. The process of claim 2 wherein a pressure control valve is used to maintain a higher pressure in the reactive zone than in the reactive distillation column.

4. The process of claim 3 wherein the reactive distillation column is operated at a pressure not exceeding atmospheric pressure.

5. The process of claim 4 wherein the reactive distillation column is operated at a pressure of less than 15 psia (0.10 MPa).

6. The process of claim 5 wherein the flow of steam is at least 30 weight percent of the flow of the reaction product.

7. The process of claim 6 wherein each plate contains:
   a plurality of perforations which allow vapor contained in the reactive distillation column to flow upward from one stage to an adjacent stage, and
   at least one downcomer tube which allows liquid contained in the reactive distillation column to flow downward from one stage to an adjacent stage.

* * * * *